(No Model.) 5 Sheets—Sheet 3.
R. L. HOLT.
NOSING MECHANISM FOR SELF ACTING SPINNING MULES, &c.

No. 380,485. Patented Apr. 3, 1888.

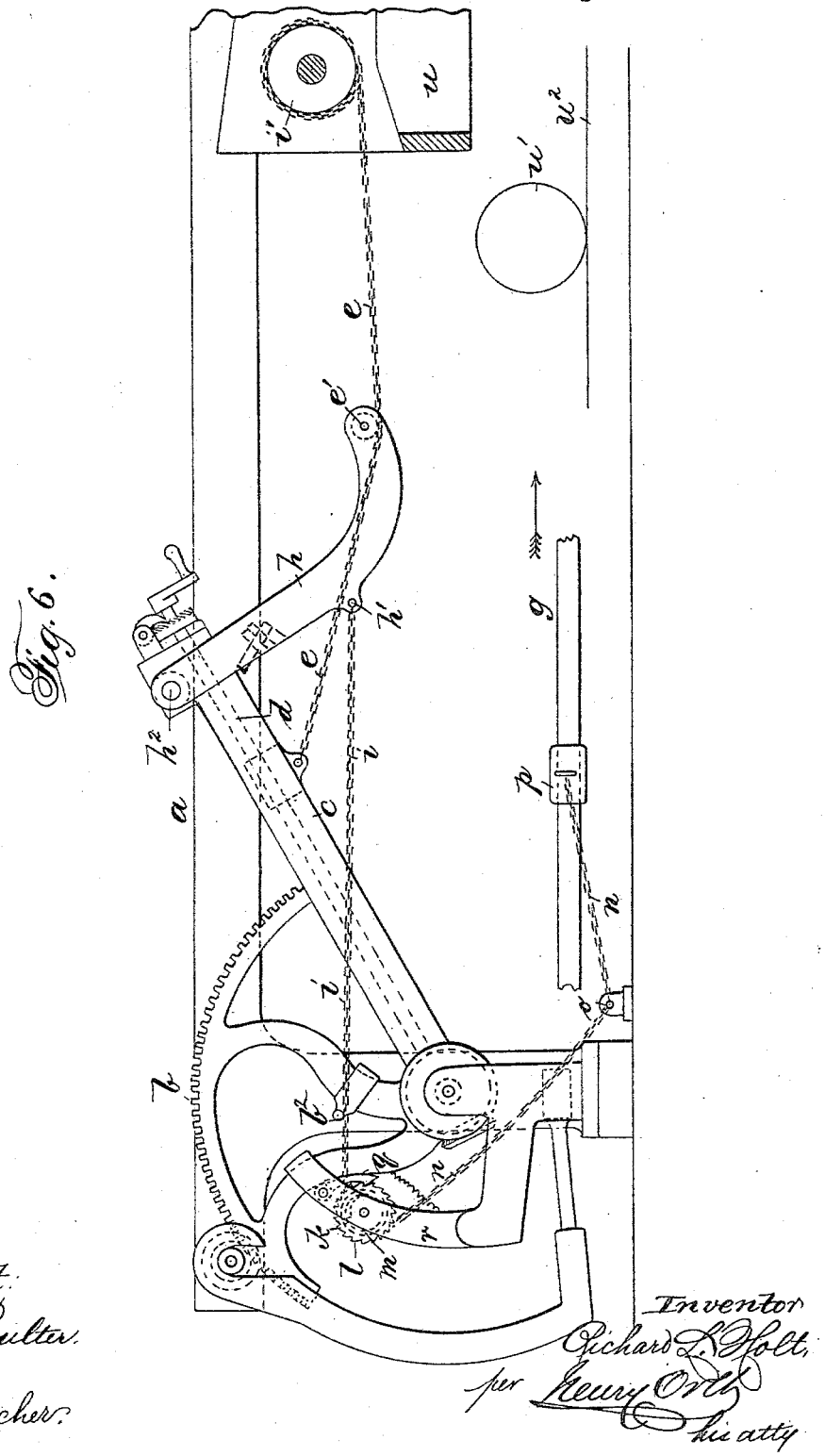

(No Model.) 5 Sheets—Sheet 5.
R. L. HOLT.
NOSING MECHANISM FOR SELF ACTING SPINNING MULES, &c.
No. 380,485. Patented Apr. 3, 1888.
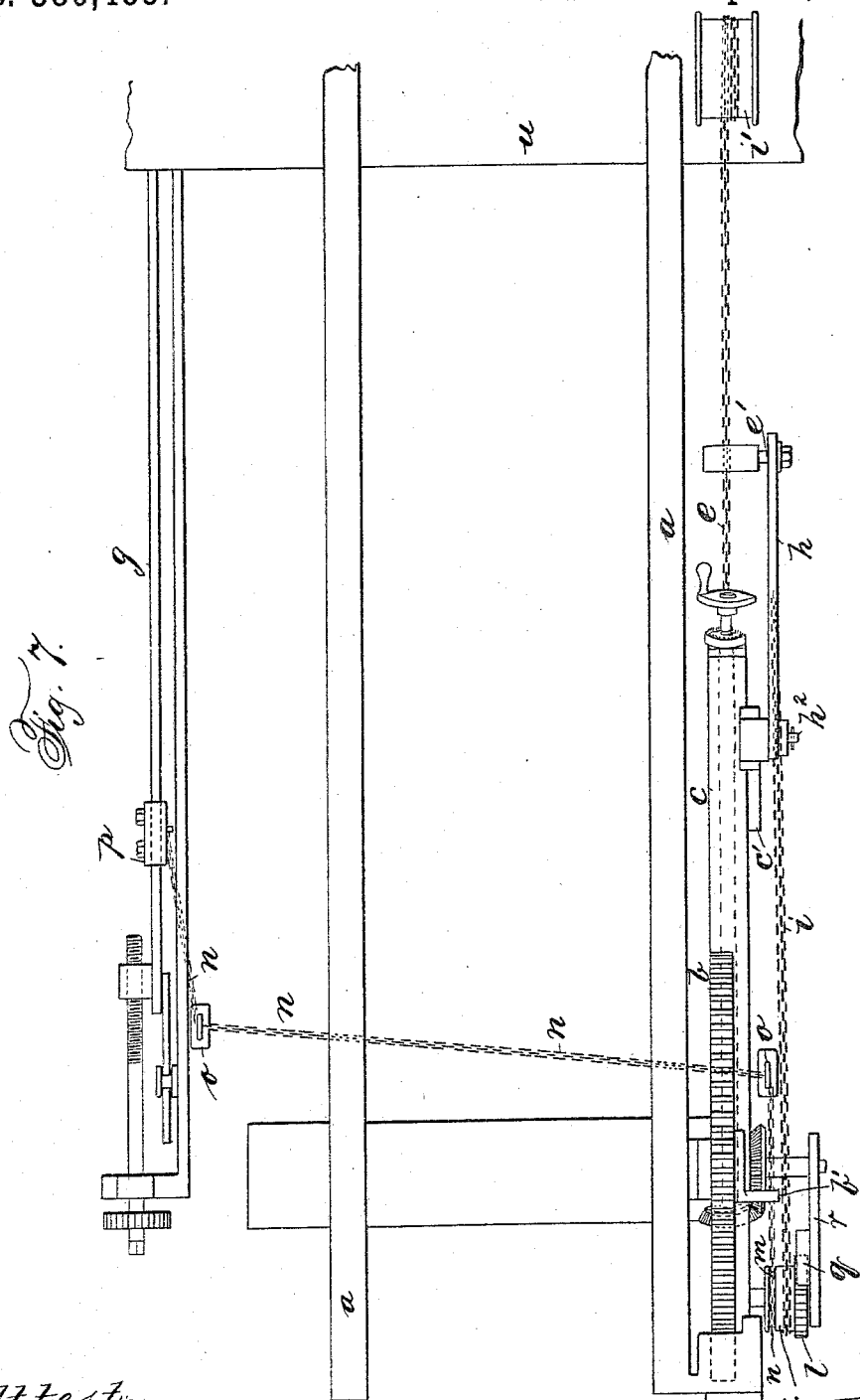

United States Patent Office.

RICHARD LEACH HOLT, OF OLDHAM, COUNTY OF LANCASTER, ASSIGNOR TO JAMES CARTER, OF STALYBRIDGE, COUNTY OF CHESTER, ENGLAND.

NOSING MECHANISM FOR SELF-ACTING SPINNING-MULES, &c.

SPECIFICATION forming part of Letters Patent No. 380,485, dated April 3, 1888.

Application filed February 28, 1887. Serial No. 229,211. (No model.) Patented in England April 22, 1886, No. 5,571; in France December 6, 1886, No. 180,100; in Belgium December 7, 1886, No. 77,362; in Canada February 26, 1887, No. 26,077; in Spain March 4, 1887, No. 6,590; in Austria-Hungary April 12, 1887, No. 49,022 and No. 13,016, and in India September 21, 1887, No. 1,234.

*To all whom it may concern:*

Be it known that I, RICHARD LEACH HOLT, a citizen of Great Britain, residing at Oldham, in the county of Lancaster and Kingdom of Great Britain, mechanic, have invented certain new and useful Improvements in Nosing Mechanisms for Self-Acting Spinning Mules and Twiners, (for which I have obtained Letters Patent in Great Britain, No. 5,571, dated April 22, 1886; in France, No. 180,100, dated December 6, 1886; in Belgium, No. 77,362, dated December 7, 1886; in India, permission to file a specification, Register No. 12 of 1887, No. 927, dated July 21, 1887, certificate of filing specification, Register No. 12 of 1887, No. 1,234, dated September 21, 1887; in Canada, No. 26,077, dated February 26, 1887; in Spain, No. 6,590, dated March 4, 1887, and in Austria-Hungary—Austria No. 49,022, vol. 37, folio 810, Hungary No. 13,016, vol. 21, folio 751—dated April 22, 1887;) and I do hereby declare the following to be a full, clear, and exact description of the invention, such as will enable others skilled in the art to which it appertains to make and use the same, reference being had to the accompanying drawings, and to the letters or figures of reference marked thereon, which form a part of this specification.

Figure 1:
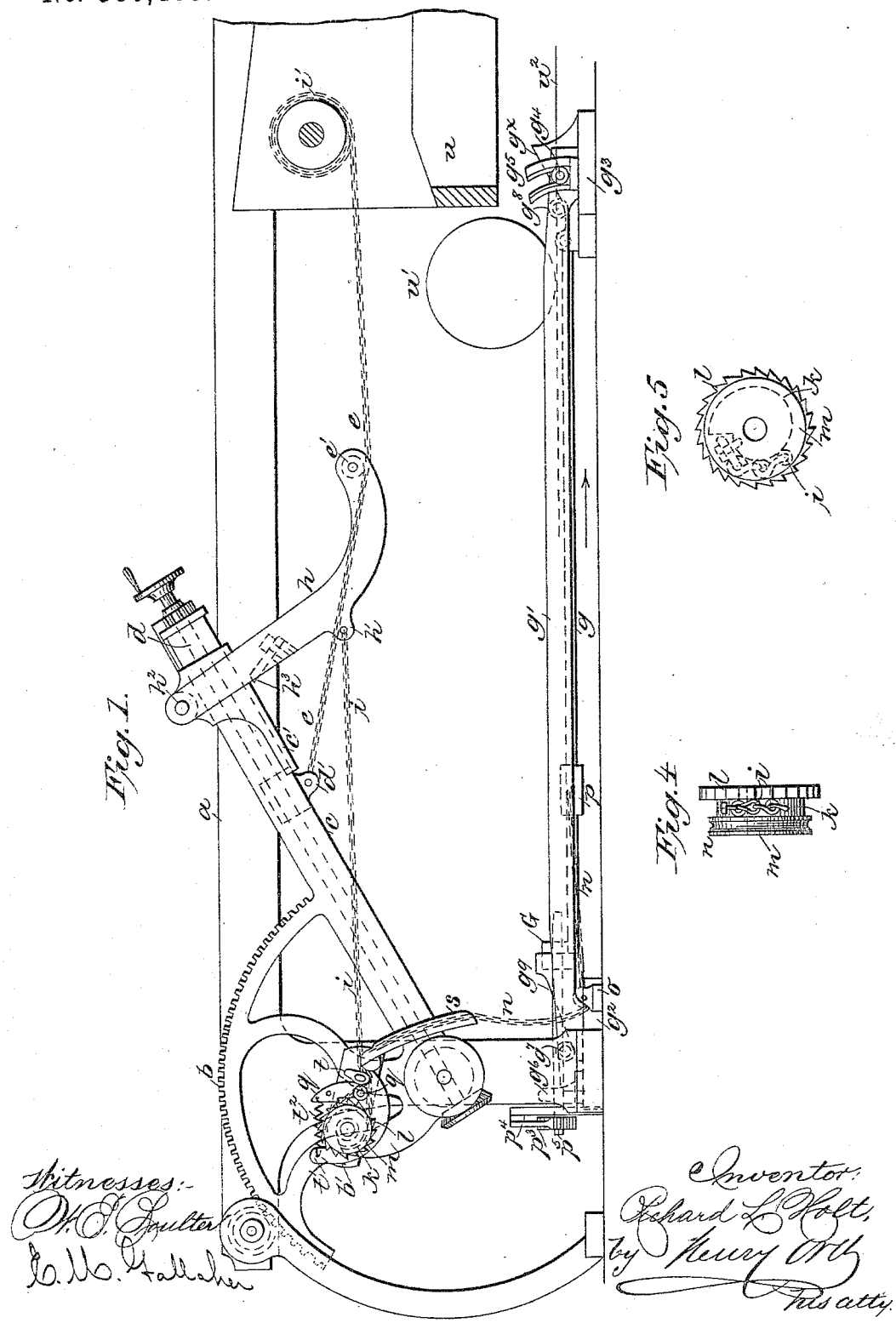
Figure 2:
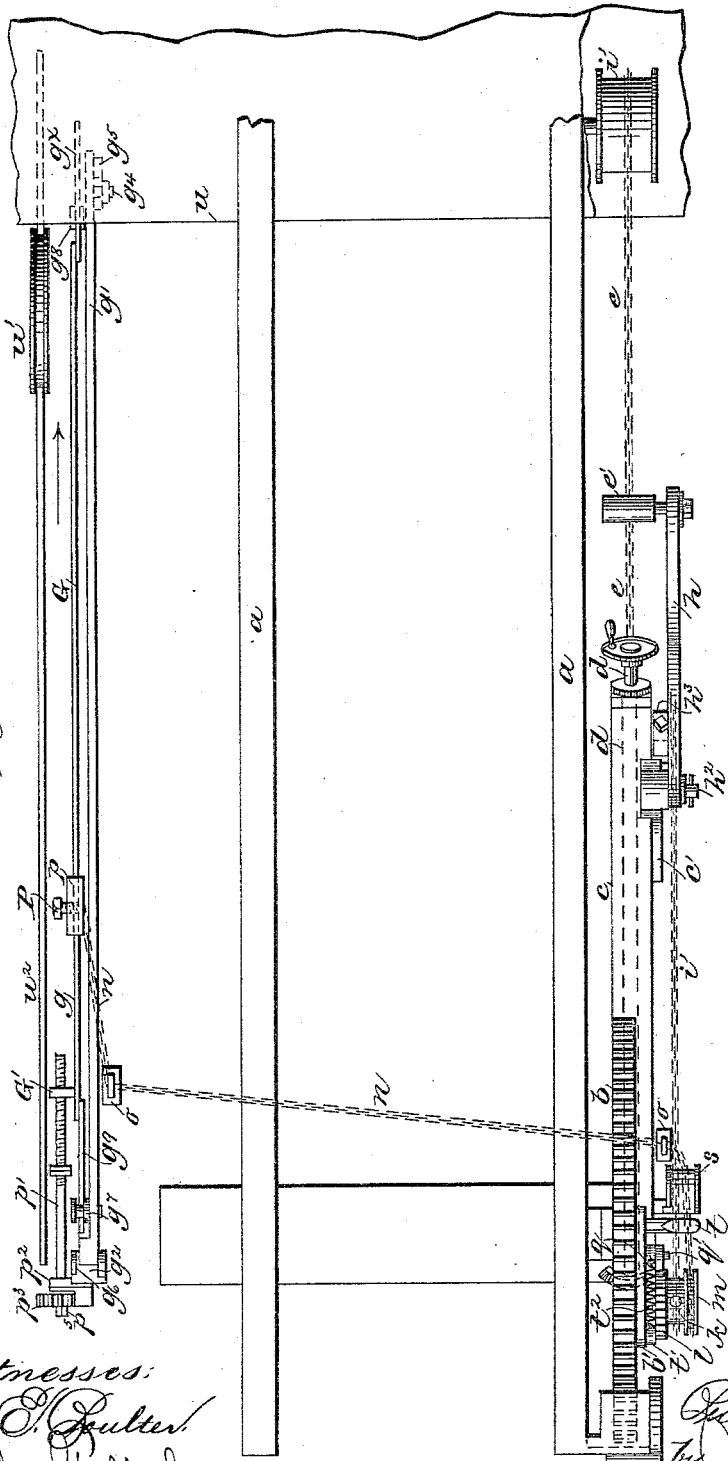
Figure 3:
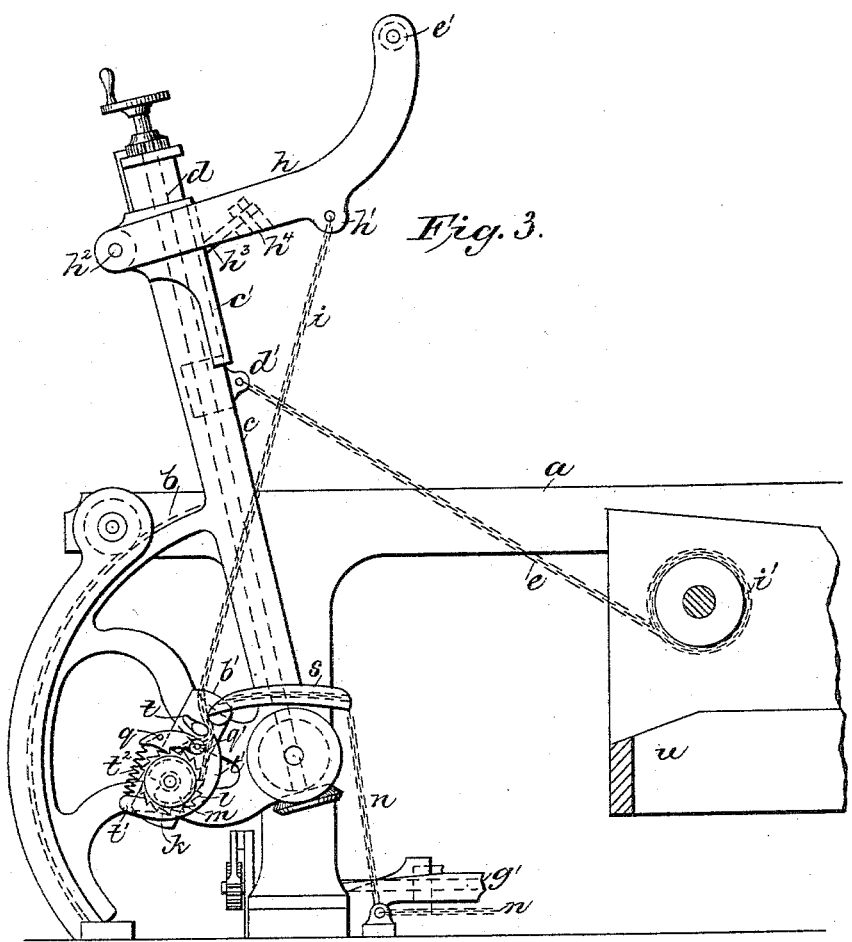

Referring to the drawings, Figure 1 is a side elevation, a portion of the mule-carriage being shown in section, of so much of a self-acting spinning-mule as is necessary to illustrate my invention. Fig. 2 is a top plan view of the same. Fig. 3 is an elevation of parts shown in Fig. 1 in another position—that is, when the radial or quadrant arm is fully back, as when the mule-carriage is out to its fullest extent from the rollers, a portion of the carriage being shown in section; and Fig. 4 is an edge view, and Fig. 5 a face view, of parts of the mechanism detached. These figures illustrate one mode of carrying out my invention. Figs. 6 and 7 are views corresponding, respectively, with Figs. 1 and 2, illustrating another mode of carrying out my invention.

The invention relates to nosing or winding-on motions or mechanisms for self-acting mules and twiners, and has for its object to provide means to relieve the shaper from all strain when operating the fallers in winding the yarn upon the spindles, and to gradually increase the speed of the spindles as the cop builds up.

To these ends the invention consists in structural features and combinations of parts, substantially as hereinafter fully described, and as set forth in the claims.

In self-acting spinning mules and twiners the yarn that is spun or twisted during each "stretch" or "going out" of the mule-carriage is wound upon the spindles to form a cop thereon. This is effected by what is known as a "radial" or "quadrant" arm, a chain one end of which is connected by means of a nut with the screw of the radial arm, the other end of said chain being connected with a drum on the shaft, that rotates the tin drum which drives the spindles, which shaft is mounted in the mule-carriage. While the bottom or full cone of the cop is being formed on the spindles the nut to which one end of the winding-on chain is attached is at its lowest point on the radial arm; but as the cop builds up the nut is caused to travel on the screw of the radial arm, thereby causing the chain end to ascend along and with the arm until the bottom or full cone of the cop is formed, when said nut may remain stationary at the upper end of said radial arm during the building of the remainder of the cop upon the spindle. The spindles taper, and as the cops build it is necessary to increase the speed of the spindles to wind the yarn sufficiently tight at the small end or nose of the cop. This is usually effected by a stud adjusted from time to time by the operator in a well-known manner, so as to flex the winding-on chain to draw more chain from the drum, and thereby increase the velocity of the shaft in which it is mounted, and consequently the velocity of the tin drum that rotates the spindles. This stud is commonly called the "nosing-stud." It has also been proposed to make the action of the stud an automatic one by means of suitable mechanism either in conjunction with a long or short shaper; but this is objectionable, owing to the strain on the shaper mechanism, whose function is thereby impaired. It has also been proposed to render this nosing action automatic by means of a constant power exerted on the chain during the building of the nose of the cop. This also is objectionable, inasmuch as a tightly-wound cop cannot be obtained, since it is necessary that a continuously and gradually increasing speed must be imparted to the cops during the operation of nosing. Finally, it has been proposed, as described in British patent to John Dodd, of January 7, 1879, No. 72, to automatically vary the speed of the spindles during the operation of nosing by the use of a scroll or winding-on drum of gradually reduced diameter, and by means of mechanism for drawing a portion of the chain automatically from the reduced portion of the drum. This mechanism consists, essentially, of a chain connected with a nosing-scroll and with the shaper mechanism, and in means for taking up the slack in the chain and altering the position of the nosing-scroll to draw off more chain from the winding-on drum during the operation of nosing and leaving the chain connected with the shaper mechanism slack to relieve said mechanism from strain during its operation.

Although my improvements are based upon the same principle of operation as set forth in the devices last referred to, yet they differ essentially in that I do not use a winding-on scroll, but devices operating to draw off a variable length of chain from an ordinary drum, as will hereinafter appear.

In the drawings, $a$ indicates a portion of the head-stock framing; $b$, the quadrant; $c$, the quadrant or radial arm; $d$, the screw of the same; $d'$, the nut that travels on the screw, to which nut one end of the winding-on chain $e$ is attached; $g$, the shaper-rod, and $u$ a portion of the mule-carriage, in which is mounted the shaft that carries the winding-on drum $i'$, which shaft gives motion to the tin drum that drives the spindles on the mule-carriage.

$g'$ indicates the shaper-rail (shown at or near its lowest position in Fig. 1) when cops are about fully formed on the spindles.

The shaper-rail $g'$ is stationary in respect of the carriage, but has a vertical reciprocating motion, being guided at each end by brackets or horns formed on or secured to plates $g^2$ and $g^3$, respectively, bolted to the floor or framing of the machine. The shaper-rail at its inner end is provided with a headed bolt, $g^4$, that lies in a curved slot formed in bracket $g^5$, said slot serving as a guide to the bolt and shaper-rail in the up and down movements of the inner end of the latter. The outer end of the shaper-rail $g'$ is guided in its rising and falling movements by two horns or lugs, $g^6$, projecting from the plate $g^2$.

At each end the shaper-rail $g'$ is provided with a stud, $g^7$ and $g^8$, respectively, that carries a roller that rests upon what is called a "shaper-plate," (shown at $g^9$ and $g^\times$, respectively,) that have a horizontal reciprocating motion upon their respective base-plates, $g^2$ and $g^3$, which base-plates also carry the horns or lugs $g^6$ and the slotted bracket $g^5$, as above described.

The shaper-plates $g^9$ and $g^\times$ are connected by a rod, $g$, so as to move in unison, and this rod has a projection, G, provided with a screw-threaded opening, in which works the shaper-screw $p'$, that has its bearing in a bracket, $p^2$, on the plate $g^2$. The outer end of the shaper-screw $p'$ carries a ratchet, $p^3$, which is partly rotated by a pawl at each outward movement of the mule-carriage to gradually move the shaper-plates $g^9$ and $g^\times$ as the cops build. The backward rotation of the shaper-screw $p'$ is prevented by a pawl, $p^4$, Fig. 1.

The shaper-rail is moved to its highest position when winding a fresh set of cops by rotating the shaper-screw in a direction the reverse of that in which it is rotated by the action of the mule-carriage when spinning by means of a key applied to the outer squared portion, $p^5$, of said screw. As the cops build, the shaper-rail descends, while the faller mechanism rises, the action of the shaper on the faller being well known and not needing to be described.

The mechanism above described is well known and commonly used in self-acting mules and operates in the usual manner.

I will now describe my improvements as applied to the above-described well-known mechanism.

On the radial or quadrant arm $c$, or to a bracket, $c'$, secured to said arm, is pivoted, at $h^2$, a lever or arm, $h$, that carries at or near its lower free end a pin or roller, $e'$, that bears upon the winding-on chain $e$ when the radial arm is in a given position, as when in the position shown in Fig. 1, so as to flex the chain from a straight line between the point of attachment of said chain to the nut $d'$ and the winding-drum $i'$. At or near its center the lever $h$ has an eye, $h'$, to which one end of a chain, $i$, is attached, the other end of said chain being partly wound around a cam or snail, $k$, mounted on a stud projecting from a bracket, $b'$, secured to the quadrant $b$. Upon the stud that carries the cam or snail $k$ is mounted a ratchet-wheel, $l$, secured to said cam or snail; or said ratchet-wheel may, as shown in Figs. 4 and 5, form an integral part of the snail. A pawl, $q$, pivoted on a stud projecting from the bracket $b'$, engages the teeth of the ratchet and holds it against rotation in one direction. Any strain or pull on the chain $i$ will tend to rotate the ratchet $l$, but the pawl $q$ holds said ratchet against such rotation, and thus sustains the strain exerted upon lever $h$ when the pin $e'$ is pressing down upon chain $e$. A pulley, $m$, is secured to or forms an integral part of snail $k$, and to said pulley is attached one end of a chain, $n$, that is partly wound on said pulley in such manner that a strain on chain $n$ will rotate the pulley, the cam or snail $k$, and the ratchet-wheel $l$ from left to right, so as to wind up a portion of the chain $i$, the pawl $q$ riding over the teeth of the ratchet during such partial rotation of the latter, and thus draw the lever $h$ toward the ratchet. The chain $n$ passes from the pulley under a guide stud or finger, $t$, projecting from bracket $b'$, thence along a groove formed in a curved guide, $s$, secured to the lower end of the radial or quadrant arm $c$. From the grooved guide $s$ the chain $n$ passes in any desired or suitable direction through guides or under pulleys $o$ to a collar or sleeve, $p$, adjustable on the shaper-rod $g$ by means of a set-screw, P, to which collar or sleeve the other end of said chain is attached. The guide-pulleys $o$ are mounted in suitable brackets secured to the floor or the framing of the machine; or, instead of guide-pulleys, perforated lugs or brackets may be used.

If preferred, the chain $i$ may be fastened to the pulley $m$, and the chain $n$ to the cam or snail $k$, and instead of the pulley a second cam or snail may be used, set, of course, in reverse direction to the cam or snail $k$, so that one will wind its chain on as the chain unwinds from the other, as hereinbefore explained, the form of the cams or snails being such that the chain $i$ will be wound up at the desired speed. A segment-wheel may be used instead of the entire ratchet-wheel $l$.

The stud or finger $t$ may form part of a lever, $t'$, pivoted upon the stud of pawl $q$, said lever being curved around the stud or shaft upon which the ratchet, cam, and pulley are mounted, the outer curved end of said lever being connected by a helical spring, $t^2$, with the pawl $q$ to hold said pawl in engagement with the teeth of the ratchet-wheel $l$ and the finger or lug $t$ on the chains $n$ and $i$, thereby pressing both chains into the groove of segment $s$, hereinbefore described, attached to the radial arm $c$ or bracket $b'$.

By the described arrangement, while the chains $n$ and $i$ and the pawl $q$ are left free to move when required, a sufficient strain is exerted upon the chains to prevent any slack therein between the pulley $m$ and snail $k$, to which said chains are attached, and the grooved guide-segment $s$. As the building of the cop proceeds the shaper-rod G is caused to move in the direction of arrow, Fig. 2, (in the usual way and by the usual mechanism,) farther from the quadrant $b$, thereby unwinding a corresponding length of chain $n$ from the pulley $m$, partially rotating the latter, and with it the cam or snail $k$, which latter winds an equal portion of chain $i$. This has the effect of drawing the arm or lever $h$ toward the radial arm or toward the left, the pin or roller thereof bearing with increasing pressure upon the winding-on chain $e$ as the cop builds, which will have the effect of tightening said chain $e$ and of correspondingly increasing the speed of the winding-on drum and its shaft, and through the latter the speed of the spindles. It will be seen that when the radial arm is moving outward with the mule-carriage the chain $n$ is gradually tightened to its full extent, which is the case when the radial arm has reached the position shown in Fig. 3, and it is at this moment that the ratchet-wheel $l$ is turned. The ratchet-wheel is, however, turned only one tooth at a time when the shaper-rod $g$ has moved to the extent of one tooth of the ratchet. It will thus be seen that when any strain does come upon the chain $n$ it will be at a time when there is no strain upon chain $i$, which strain is exerted upon the ratchet-pawl only when the carriage is moving in to wind the thread on the spindles.

The amplitude of oscillation or motion of the arm or lever $h$ toward the snail $k$ is limited by a stop-plate, $h^3$, secured to said lever, said plate abutting against the radial arm $c$ or the bracket $c'$ thereon when the lever $h$ is in or about in the position shown in Fig. 3. As the radial arm moves back or rises after each stretch, the lever $h$ falls, its downward movement being limited by the stop-plate $h^3$, as will be readily understood.

In Figs. 6 and 7 I have illustrated a modified arrangement of devices whereby the above-described results are obtained. The pulley $m$, snail $k$, ratchet-wheel $l$, and the spring-actuated pawl may be mounted on a bracket-arm, $r$, secured to any conveniently-situated fixed part of the mule-framing or to the floor. As in this case the described parts do not move with the quadrant, I provide the latter with a pin or projection, $b^2$, that will bear on the chain $n$ as the quadrant oscillates, and when the chain is tightened by the copping motion unwinds it from the pulley $m$, which is thereby partially rotated together with the snail $k$, which winds up a portion of the chain $i$. The chain $n$ is in a plane nearer to the quadrant than the chain $i$, and the projecting pin $b^2$ is long enough to reach chain $n$, but is short enough to pass clear of chain $i$. It will thus be seen that the pin $b^2$ acts to tighten the chain $n$ to its greatest extent when the radial arm is making its back oscillation, as before explained in reference to Figs. 1 and 2, so that the ratchet is moved when not subjected to strain from the chain $i$.

At the commencement of a fresh set of cops the ratchet-wheel in each modification is turned back to a point fixed upon for its position at the said commencement of each fresh set of cops.

It will be understood that the winding-on chain $e$ is attached to the ordinary cylindrical winding-on drum, and that the operation of the described mechanism is to cause said drum to rotate more rapidly at the time the yarn is winding on the nose part of the cop by drawing off more chain from said drum than would be drawn off by the mere motion derived from the going in of the mule-carriage if the nosing mechanism were not present. I wish this understood, because, as hereinbefore alluded to, there are automatic nosing motions which do not shorten nor take up the winding-on chain during each stretch, but which act by gradually winding up and drawing off a portion of the chain from a drum, so as to bring the operative portion of the chain more and more upon a scroll of less diameter than the cylindrical portion of said drum to increase the speed thereof. My invention is, however, applicable to such drums, the winding-on chain working entirely on the cylindrical portion, which acts simply as an ordinary cylindrical winding-on drum.

I am aware that levers have been proposed connected with the radial arm arranged to operate on the winding-on chain, and that it has also been proposed to regulate the winding-on by chains or connections with the copping-rail or its mechanism. These, as heretofore stated, are, however, objectionable, for the reason that the strain upon the winding-on chain is thrown upon or partly thrown upon the copping-rail or shaper mechanism. This objectionable feature is avoided by my invention, the proper function of the copping-rail or shaper mechanism being in nowise affected. The described mechanism is also automatic in its function, and does not require adjustment when changing "counts" apart from the change in copping motion for this purpose.

Having now described my invention, what I claim is—

1. The combination, with a cylindrical winding-on drum, the winding on chain, the quadrant, the quadrant or radial arm, and the shaper-rod of a self-acting spinning-mule, of a lever operating on the winding-on chain to draw off a variable length of chain from the winding-on drum, a draft chain connected with said lever, and take-up devices controlled from the shaper-rod and operating to take up the slack in the draft-chain, comprising a winding-on cam for said chain, operated from the shaper mechanism, and a ratchet and pawl for controlling the movements of the cam, substantially as described.

2. The combination, with a cylindrical winding-on drum, the winding-on chain, the quadrant, the quadrant or radial arm, and the shaper-rod of a self-acting spinning-mule, of a lever operating on the winding-on chain to draw off a variable length of chain from the winding-on drum, a draft-chain connected with said lever, and take-up devices controlled from the shaper-rod and operating to take up the slack in the draft-chain, comprising a winding-on cam for said chain, operated from the shaper mechanism, a ratchet and pawl for controlling the movements of the cam, a chain connected with the shaper-rod, and a chain-pulley for rotating the cam, substantially as described.

3. The combination, substantially as described, with the winding-on drum, the winding-on chain, the quadrant provided with a pin, $b^2$, the quadrant or radial arm, and the shaper-rod of a self-acting spinning-mule, of the lever $h$, pivoted to the radial arm, the ratchet-wheel $l$, pawl $q$, the cam or snail $k$, the chain $i$, secured to said cam and the lever $h$, the pulley $m$, the shaper-rod, and the chain $n$, connected respectively with pulley $m$ and the shaper-rod, said parts being constructed and arranged substantially as and for the purpose specified.

In testimony whereof I affix my signature in the presence of two subscribing witnesses.

RICHARD LEACH HOLT.

Witnesses:
ROBERT INNES,
PETER J. LOSEY.